United States Patent
Yang et al.

(10) Patent No.: US 10,606,115 B2
(45) Date of Patent: Mar. 31, 2020

(54) LIQUID CRYSTAL DISPLAY DEVICE

(71) Applicant: InnoLux Corporation, Jhu-Nan, Miao-Li County (TW)

(72) Inventors: Ching-Che Yang, Jhu-Nan (TW); Mao-Shiang Lin, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/954,166

(22) Filed: Apr. 16, 2018

(65) Prior Publication Data
US 2018/0314106 A1    Nov. 1, 2018

(30) Foreign Application Priority Data

Apr. 26, 2017   (CN) .......................... 2017 1 0281292

(51) Int. Cl.
*G02F 1/1335*    (2006.01)
*G02F 1/1362*    (2006.01)
*G02F 1/1343*    (2006.01)
*G02F 1/1337*    (2006.01)

(52) U.S. Cl.
CPC .. *G02F 1/133512* (2013.01); *G02F 1/133707* (2013.01); *G02F 1/134309* (2013.01); *G02F 1/136209* (2013.01); *G02F 1/136286* (2013.01); *G02F 1/13439* (2013.01); *G02F 2001/136222* (2013.01); *G02F 2201/121* (2013.01)

(58) Field of Classification Search
CPC ......... G02F 1/136209; G02F 1/133512; G02F 1/134363; G02F 2001/134372; G02F 2001/134318; G02F 1/136286; G02F 1/133707; G02F 2001/136222
See application file for complete search history.

(56) References Cited

U.S. PATENT DOCUMENTS

| | | | |
|---|---|---|---|
| 5,459,596 A * | 10/1995 | Ueda ................. | G02F 1/136213 349/111 |
| 2002/0057411 A1* | 5/2002 | Kim ................... | G02F 1/133512 349/141 |
| 2004/0119927 A1* | 6/2004 | Kang ................. | G02F 1/133512 349/141 |
| 2005/0219446 A1* | 10/2005 | Hisatake ........... | G02F 1/133555 349/114 |
| 2008/0042158 A1* | 2/2008 | Oke .................. | G02F 1/134363 257/99 |

(Continued)

*Primary Examiner* — Jessica M Merlin
(74) *Attorney, Agent, or Firm* — Muncy, Geissler, Olds & Lowe, PC (57) ABSTRACT

A liquid crystal display device includes a first substrate, a second substrate disposed opposite to the first substrate, a gate line disposed on the second substrate, an electrode layer disposed on the second substrate, and a light shielding portion disposed at a side of the first substrate facing the second substrate. The electrode layer includes a first electrode portion and a second electrode portion. The gate line is disposed between the first electrode portion and the second electrode portion. A projection area of the light shielding portion projected on the second substrate is overlapped with the gate line, and the projection area has a first side and a second side. The first electrode portion has a third side and a fourth side. The third side is disposed away from the gate line, and the first side is disposed between the third side and the fourth side.

19 Claims, 5 Drawing Sheets

(56) References Cited

U.S. PATENT DOCUMENTS

2009/0141231 A1\* 6/2009 Lim .................. G02F 1/1309
  349/192
2016/0141307 A1\* 5/2016 Lee .................. H01L 27/124
  257/72

\* cited by examiner

LIQUID CRYSTAL DISPLAY DEVICE

CROSS REFERENCE TO RELATED APPLICATIONS

This Non-provisional application claims priority under 35 U.S.C. § 119(a) on Patent Application No(s). 201710281292.4 filed in People's Republic of China on Apr. 26, 2017, the entire contents of which are hereby incorporated by reference.

BACKGROUND

Technical Field

The disclosure relates to a liquid crystal display device and, in particular, to a COA (Color filter On Array) liquid crystal display device.

Related Art

With the development of technologies, display devices have been widely applied to various fields. Due to the advantages such as low power consumption, less weight, compact size and less radiation, the liquid crystal display (LCD) devices have gradually replaced the traditional cathode ray tube (CRT) display devices and been applied to various electronic products, such as mobile phones, portable multimedia devices, notebook computers, liquid crystal TVs and liquid crystal screens.

Regarding to a COA (Color filter On Array) liquid crystal display device, the color filter is disposed on the lower substrate, so that the upper substrate and the black matrix (BM) layer disposed on the upper substrate have a sufficient thickness difference. This thickness difference can cause the tilt of the liquid crystals disposed at the edge of the BM layer, which will lead to the light leakage in the dark state and the decrease in contrast. In order to reduce the light leakage issue, it is general to provide an overcoat layer to cover the BM layer for decreasing the thickness difference between the BM layer and the layer surrounding the BM layer. However, this solution will increase the manufacturing cost and the risk in reliability.

SUMMARY

A liquid crystal display device includes a first substrate, a second substrate disposed opposite to the first substrate, a gate line disposed on the second substrate, an electrode layer disposed on the second substrate, and a light shielding portion disposed on the first substrate. The electrode layer includes a first electrode portion and a second electrode portion, and the gate line is disposed between the first electrode portion and the second electrode portion. A projection area of the light shielding portion projected on the second substrate is overlapped with the gate line and the first electrode portion, and the projection area has a first side and a second side. The first electrode portion has a third side and a fourth side. The third side is disposed away from the gate line, and the first side is disposed between the third side and the fourth side.

In the liquid crystal display device of this disclosure, the position of the light shielding portion is controlled, so that the boundary of the projection area of the light shielding portion projected on the second substrate is disposed within the electrode portion Accordingly, the liquid crystals disposed at the edge of the light shielding portion can be covered by the first electrode portion and the second electrode portion, thereby effectively reducing the light leakage at the edge of the light shielding portion. In addition, the conventional overcoat layer is not needed, so that the manufacturing cost can be reduced.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE INVENTION

The embodiments of the disclosure will be apparent from the following detailed description, which proceeds with reference to the accompanying drawings, wherein the same references relate to the same elements.

Figure 1:
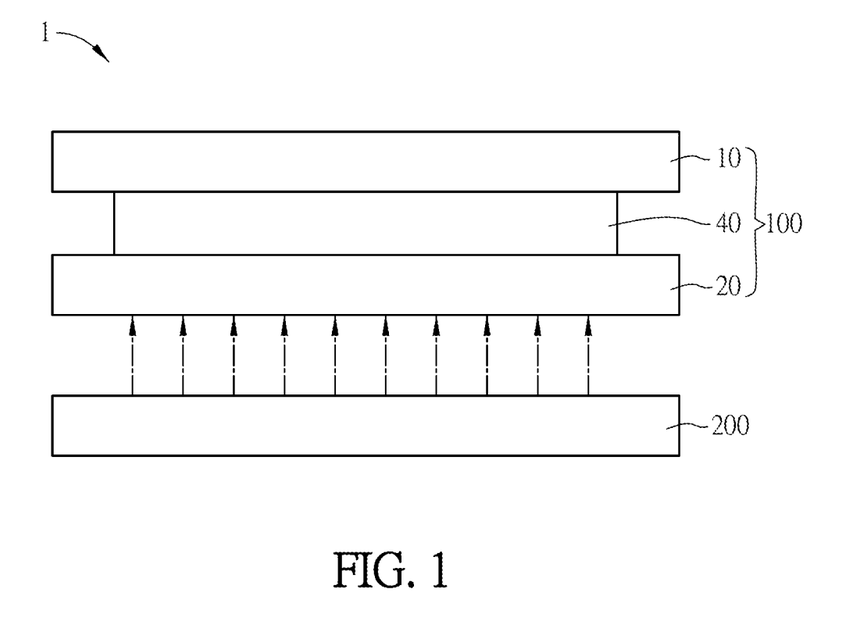
FIG. 1 is a schematic diagram showing a liquid crystal display device according to an embodiment of the disclosure.
Figure 2:
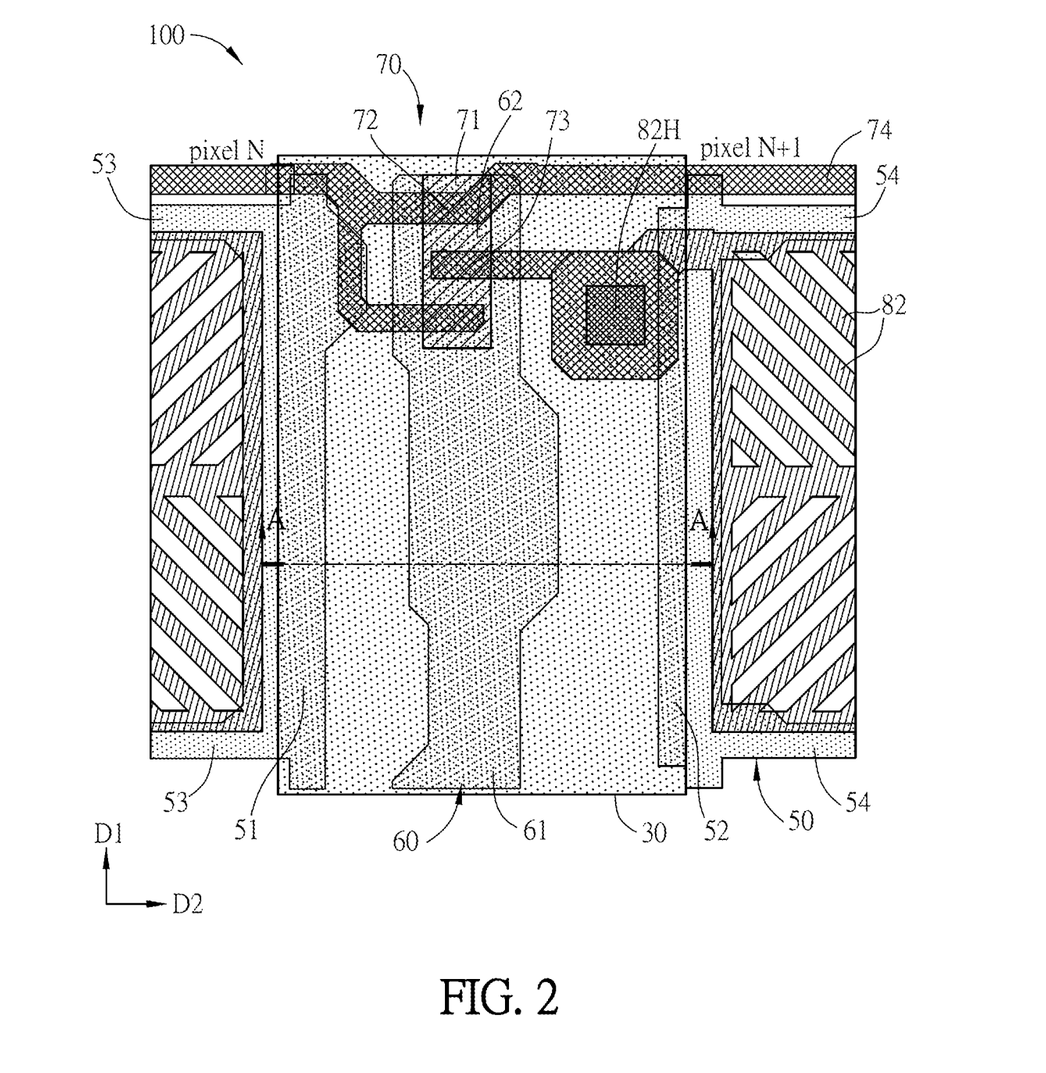
FIG. 2 is a schematic diagram showing a part of the circuit layout of the liquid crystal display device according to the embodiment of the disclosure.
Figure 3:
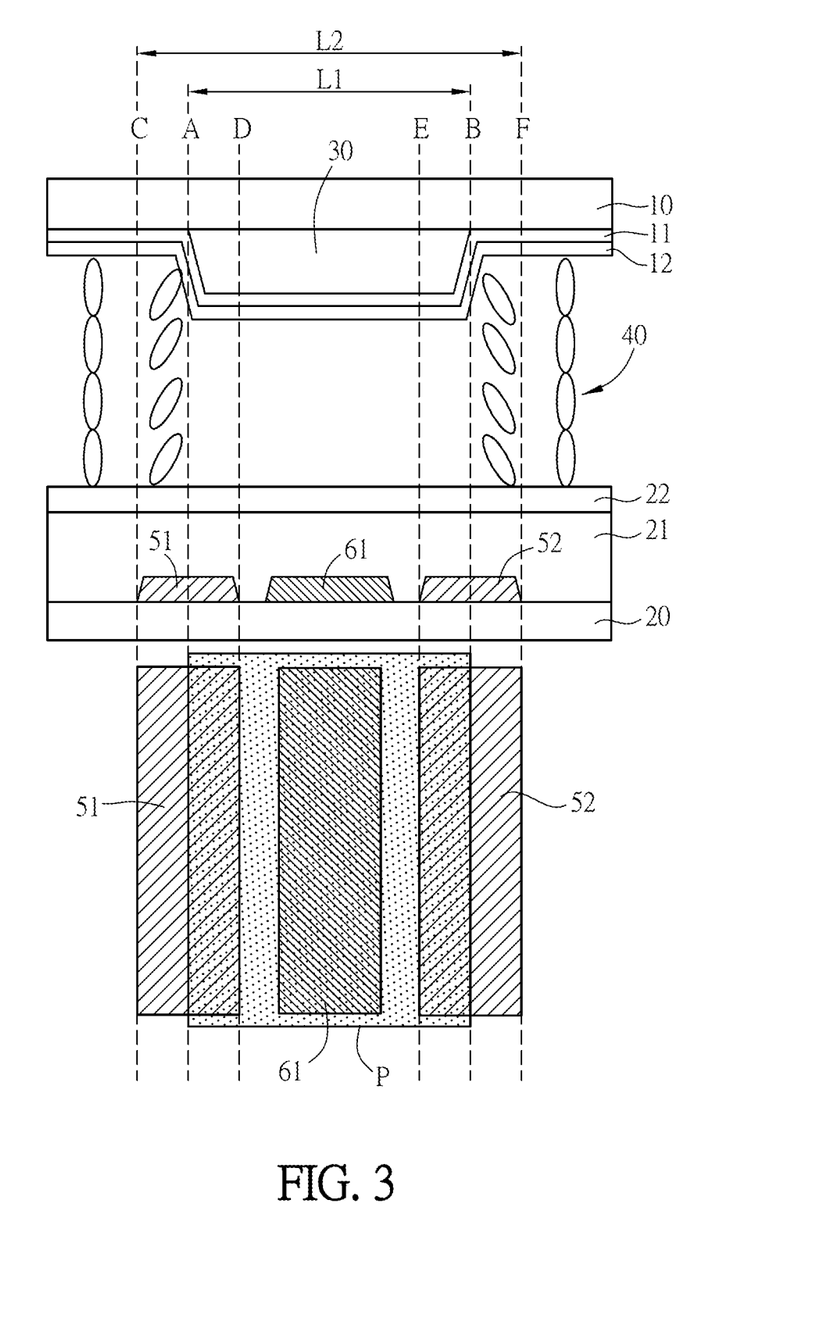
FIG. 3 is a schematic cross-sectional view along the line A-A of FIG. 2 showing the corresponding positions of the circuit layout and the liquid crystal display device.

FIG. 1 is a schematic diagram showing a liquid crystal display device 1 according to an embodiment of the disclosure, FIG. 2 is a schematic diagram showing a part of the circuit layout of the liquid crystal display panel 100 according to the embodiment of the disclosure, and FIG. 3 is a schematic cross-sectional view along the line A-A of FIG. 2 showing the corresponding positions of the circuit layout and the liquid crystal display panel 100. Referring to FIGS. 1, 2 and 3, the liquid crystal display device 1 includes a liquid crystal display panel 100 and a backlight module 200 disposed at one side of the liquid crystal display panel 100. FIG. 2 shows two adjacent pixels (e.g., a pixel N and a pixel N+1) of the circuit layout for an illustration. Person having ordinary skill in the art should understand that the pixel N and the pixel N+1 are only for illustration, the liquid crystal display device 1 may have more pixels depending on the needs, and the layout of the pixel N and the pixel N+1 may be repeated in part of the display device 1.

In this embodiment, the liquid crystal display panel 100 includes a first substrate 10, a second substrate 20 disposed opposite to the first substrate 10, a light shielding portion 30 disposed on the first substrate 10, a display medium layer 40 disposed between the first substrate 10 and the second substrate 20, an electrode layer 50 disposed on the second substrate 20, a gate layer 60 disposed on the second substrate, and a transistor unit 70 disposed on the second substrate 20.

An electroconductive layer 11 and a first alignment layer 12 are disposed on the first substrate 10. The electroconductive layer 11 can include a single-layered transparent conductive layer or multiple transparent conductive layers, and the material of the electroconductive layer 11 may include, for example, ITO (Indium Tin Oxide), IZO (Indium Zinc Oxide), AZO (Aluminum Zinc Oxide), ZnO (Zinc Oxide), $SnO_2$, $In_2O_3$, or any combination thereof. The electroconductive layer 11 can be a common electrode. A color filter 21 and a second alignment layer 22 are disposed on the second substrate 20. For example, the material of the first alignment layer 12 and the second alignment layer 22 may include PI (polyimide). The light shielding portion 30 is disposed at one side of the first substrate 10 facing the second substrate 20, and it may include a black matrix (BM). The display medium layer 40 may be a layer including at least one kind of display medium, such as a liquid crystal, an organic light-emitting diode (OLED), a quantum dot (QD), a fluorescence, a phosphor, a light-emitting diode (LED), a mini light-emitting diode, or a micro light-emitting diode, but the disclosure is not limited thereto. In some examples, the chip size of the light-emitting diode may be in a range from about 300 μm to about 10 mm. The chip size of the mini light-emitting diode may be in a range from about 100 μm to about 300 μm. The chip size of the micro light-emitting diode may be in a range from about 1 μm to about 100 μm, but the disclosure is not limited thereto.

The gate layer 60 is disposed on the second substrate 20. In this embodiment, the gate layer 60 includes a gate line 61 and a gate 62 electrically connected with the gate line 61. The gate 62 is a part of the transistor unit 70. The transistor unit 70 includes an active layer 71, the gate 62, a source 72, and a drain 73, and the source 72 is electrically connected with a data line 74. The gate line 61 extends along a first direction D1. The data line 74 is disposed on the second substrate 20. The data line 74 crosses with the gate line 61 and extends along a second direction D2. The first direction D1 and the second direction D2 are different. For example, the first direction D1 can be perpendicular to the second direction D2, but this disclosure is not limited thereto.

The electrode layer 50 is disposed on the second substrate 20. Herein, the electrode layer 50 can be a common electrode layer and disposed within the entire liquid crystal display panel 100. The electrode layer 50 includes a first direction electrode portion along the first direction D1 and a second direction electrode portion along the second direction D2. The first direction electrode portion includes a first electrode portion 51 and a second electrode portion 52, which are disposed at two sides of the gate line 61, respectively. The second direction electrode portion includes a third electrode portion 53 and a fourth electrode portion 54. Although the first electrode portion 51 and the second electrode portion 52 as shown in FIG. 2 are not connected, the first electrode portion 51 and the second electrode portion 52 may be electrically connected (not shown) and are disposed adjacent to each other. For example, the first electrode portion 51 and the second electrode portion 52 can be disposed in two adjacent pixel areas (e.g., the pixel N and the pixel N+1), respectively. The widths of the first electrode portion 51 and the second electrode portion 52 can be the same or different. The measuring direction of the widths of the first electrode portion 51 and the second electrode portion 52 may be along the second direction D2.

The gate line 61 is disposed between the first electrode portion 51 and the second electrode portion 52. The active layer 71 and the gate line 61 are disposed between the first electrode portion 51 and the second electrode portion 52. The gate layer 60 and the electrode layer 50 (the common electrode layer) may be the same layer. In other words, the gate layer 60 and the electrode layer 50 can be formed at the same time. For example, a metal layer is formed on the second substrate 20, and a lithography process is performed to pattern the metal layer so as to form the gate layer 60 and the electrode layer 50 by the process. In more specific, the gate line 61, the gate 62, the first electrode portion 51 and the second electrode portion 52 are formed by one process. In this embodiment, the material of the metal layer can include aluminum, copper, molybdenum, titanium, chromium, tungsten, any alloy thereof, or any combination thereof.

Referring to FIGS. 2 and 3, in order to reduce the light leakage of the light shielding portion 30 in dark state caused by the tilted liquid crystals disposed at the edge of the light shielding portion 30, the light shielding portion 30 of the embodiment can be projected on the second substrate 20 to form a projection area P, which is overlapped with the gate line 61. At least parts of two opposite sides of the projection area P are disposed on the first electrode portion 51 and the second electrode portion 52. Herein, the two opposite sides of the projection area P are defined as a first side A and a second side B. The two opposite sides of the first electrode portion 51 are defined as a third side C and a fourth side D. The third side C is disposed away from the gate line 61, and the first side A is disposed between the third side C and the fourth side D. In addition, the two opposite sides of the second electrode portion 52 are defined as a fifth side E and a sixth side F. The sixth side F is disposed away from the gate line 61, and the second side B is disposed between the fifth side E and the sixth side F. The distance L1 between the first side A and the second side B of the projection area P of the light shielding portion 30 is less than the distance L2 between the third side C (outer side) of the first electrode portion 51 and the sixth side F (outer side) of the second electrode portion 52. In some examples, a distance between the first electrode portion 51 and the gate line 61 is different from a distance between the second electrode portion 52 and the gate line 61.

In some embodiments, the first side A of the projection area P of the light shielding portion 30 is disposed within the first electrode portion 51, that is, the first side A is disposed between the third side C of the first electrode portion 51 and the fourth side D of the first electrode portion 51. In other words, the distance between the first side A and the third side C is greater than 0 μm, and the distance between the first side A and the fourth side D is greater than 0 μm. For example, the distance between the first side A and the third side C is in a range from 5 μm to 15 μm, such as 8 μm or 12 μm, and the distance between the first side A and the fourth side D is in a range from 5 μm to 15 μm, such as 8 μm or 12 μm. In some embodiments, the second side B of the projection area P of the light shielding portion 30 is disposed within the second electrode portion 52, that is, the second side B is disposed between the fifth side E of the second electrode portion 52 and disposed the sixth side F of the second electrode portion 52. In other words, the distance between the second side B and the fifth side E is greater than 0 μm, and the distance between the second side B and the sixth side F is greater than 0 μm. For example, the distance between the second side B and the fifth side E is in a range from 5 μm to 15 μm, such as 8 μm or 12 μm, and the distance between the second side B and the sixth side F is in a range from 5 μm and 15 μm, such as 8 μm or 12 μm. In some embodiments, the widths of the first electrode portion 51 and the second portion 52 are in a range from 10 μm to 30 μm, such as 15 μm, 20 μm, or 25 μm. In this disclosure, the first side A, the second side B, the third side C, the fourth side D, the fifth side E and the sixth side F may be along the first direction D1, and the measured distances between two of the sides are along the second direction D2. In some examples, a distance between the first side A and the third side C is different from a distance between the second side B and the sixth side F.

In one embodiment, the first side A is disposed at the middle part of the first electrode portion 51. In some examples, a ratio of the distance between the first side A and the third side C to the distance between the first side A and the fourth side D may be in a range from 0.95 to 1.05. Similarly, the second side B is disposed at the middle part of the second electrode portion 52. In some examples, a ratio of the distance between the second side B and the fifth side E to the distance between the second side B and the sixth side F may be in a range from 0.95 to 1.05.

In some embodiments, the positions of the opposite sides of the light shielding portion 30 may be controlled. In more detailed, the boundary of the projection area P of the light shielding portion 30 is disposed within the range of the electrode portions, so that the two opposite sides of the projection area P are disposed between the third side C of the first electrode portion 51 and the sixth side F of the second electrode portion 52, but not disposed on the third side C and the sixth side F. In other words, the distance L1 between the two sides of the projection area P of the light shielding portion 30 is less than the distance L2 between the third side C of the first electrode portion 51 and the sixth side F of the second electrode portion 52. Accordingly, the liquid crystals disposed at the edge of the light shielding portion 30 can be covered by the first electrode portion 51 and the second electrode portion 52. This configuration can effectively reduce the light leakage issue of the edge of the light shielding portion 30, thereby decreasing the variation of the alignment aperture ratio of the first substrate 10 and the second substrate 20. In addition, the conventional overcoat layer on the first substrate 10 may not be necessary during the manufacturing processes of the display panel. In some embodiments, the overcoat layer may be provided on the first substrate 10 of the disclosure. For example, the overcoat layer (not shown) may be disposed between the light shielding portion 30 and the first alignment layer 12.

According to the design of this disclosure, when the deviation or other variation of the processes causing the alignment shift, the first side A and the second side B can be still respectively disposed on the first electrode portion 51 and the second electrode portion 52, thereby achieving the desired effect of this disclosure. In some embodiments, the first side A and the second side B are not necessary to be disposed at the middle parts of the first electrode portion 51 and the second electrode portion 52, respectively. In this disclosure, the first side A and the second side B can be disposed at any position within the first electrode portion 51 and the second electrode portion 52, so that the first electrode portion 51 and the second electrode portion 52 can cover the edge of the light shielding portion 30. In other words, the first side A can be disposed at any position between the third side C and the fourth side D (not on the third side C and the fourth side D), and the second side B can be disposed at any position between the fifth side E and the six side F (not on the fifth side E and the six side F). In other words, the first side A of the projection area P of the light shielding portion 30 is disposed within the first electrode portion 51, and the second side B of the projection area P of the light shielding portion 30 is disposed within the second electrode portion 52. This disclosure is not limited to the above embodiments.

Figure 4:
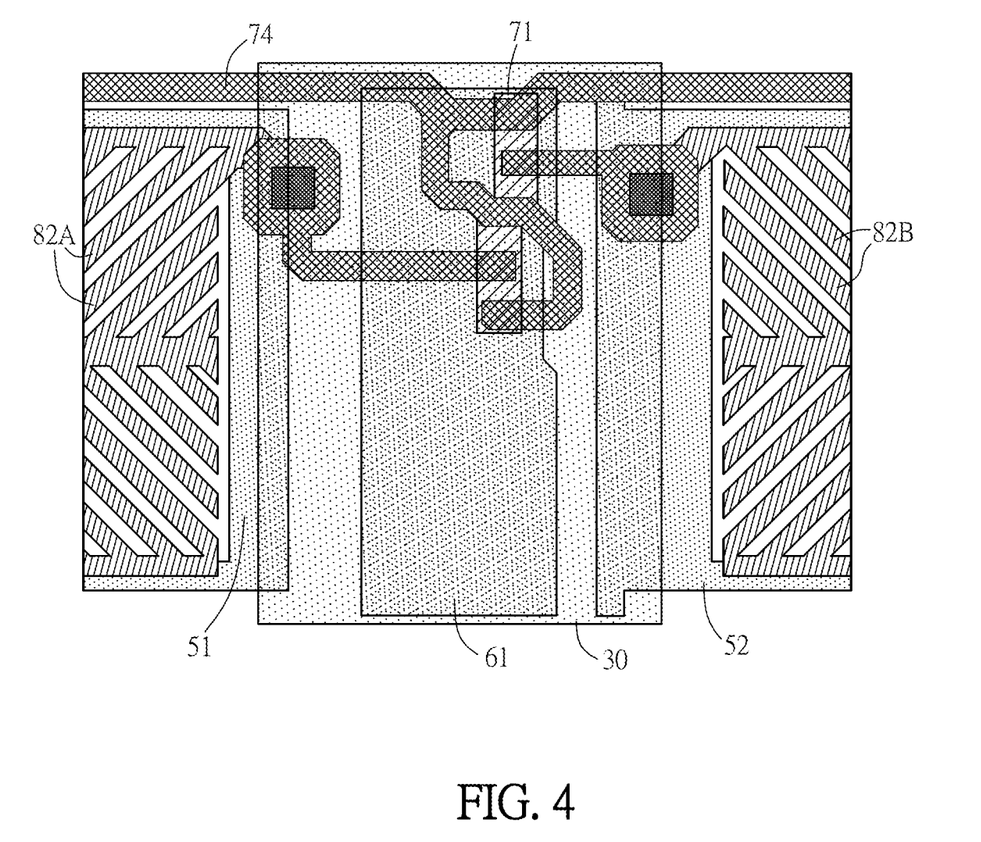
FIG. 4 is a schematic diagram showing a part of the circuit layout of a liquid crystal display device according to another embodiment of the disclosure.
Figure 5:
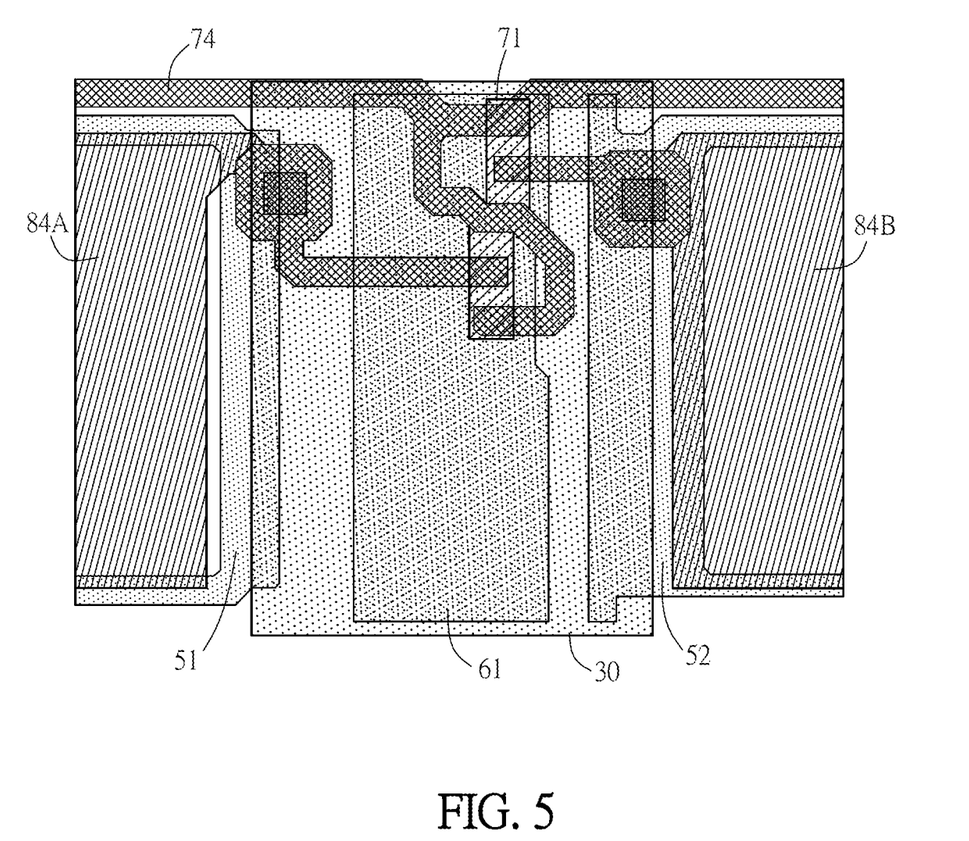
FIG. 5 is a schematic diagram showing a part of the circuit layout of a liquid crystal display device according to another embodiment of the disclosure.

The feature of controlling the positions of the opposite sides of the light shielding portion 30 can be applied to various kinds of liquid crystal display device 1, such as a VA (vertical alignment) type liquid crystal display device, a PA (photo-alignment) type liquid crystal display device, an FFS (fringe field switching) type liquid crystal display device, or an IPS (in-plane switching) type liquid crystal display device. For example, in the VA type liquid crystal display device as shown in FIG. 2, the pixel electrode 82 includes a plurality of slits and is electrically connected with the drain 73 via the through hole 82H. FIG. 4 shows an LCS (Low Color Shift) VA type liquid crystal display device according to one embodiment of the disclosure. As shown in FIG. 4, the pixel electrode 82 includes two areas: the pixel electrode area 82A and the pixel electrode area 82B, which are controlled by the same gate line 61 but different transistors. The gate line 61 is disposed between the pixel electrode area 82A and the pixel electrode area 82B. The pixel electrode 82 has a plurality of slits. The width of the first electrode portion 51 may be different from the width of the second electrode portion 52. FIG. 5 shows a PA type liquid crystal display device according to one embodiment of the disclosure. As shown in FIG. 5, the pixel electrode 82 includes two areas: the pixel electrode area 84A and the pixel electrode area 84B, which are controlled by the same gate line 61 but different transistors. The gate line 61 is disposed between the pixel electrode area 84A and the pixel electrode area 84B. The pixel electrode 82 may not include any slit. The width of the first electrode portion 51 may be different from the width of the second electrode portion 52.

As mentioned above, in some embodiments, the positions of the opposite sides of the light shielding portion 30 of the liquid crystal display device 1 is controlled, so that the boundary of the projection area P of the light shielding portion 30 projected on the second substrate 20 is disposed between the two outer sides of the electrode portions but not on the sides of the electrode portions. Accordingly, the liquid crystals disposed at the edge of the light shielding portion 30 can be covered by the first electrode portion 51 and the second electrode portion 52, thereby effectively reducing the light leakage at the edge of the light shielding portion 30. In addition, the conventional overcoat layer may be not needed, so that the manufacturing cost can be reduced.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A liquid crystal display device, comprising:
a first substrate;
a second substrate disposed opposite to the first substrate;
a gate line disposed on the second substrate and extending along a first direction;
an electrode layer disposed on the second substrate, wherein the electrode layer comprises a first electrode portion, a second electrode portion and two third electrode portions, and the gate line is disposed between the first electrode portion and the second electrode portion;
a light shielding portion disposed on the first substrate, wherein a projection area of the light shielding portion projected on the second substrate is overlapped with the gate line and the first electrode portion, and the projection area has a first side and a second side;
a pixel electrode disposed between the first substrate and the second substrate, wherein the pixel electrode comprises a trunk; and a plurality of slits, wherein a part of the plurality of slits are located near a first lateral of the trunk, and another part of the plurality of slits are located near a second lateral of the trunk, one of the plurality of slits has an edge close to the trunk, and the edge is parallel with an extension direction of the trunk;

wherein the first electrode portion has a third side and a fourth side, the third side is disposed away from the gate line, and the first side is disposed between the third side and the fourth side;

wherein the first electrode portion and the second electrode portion extend along the first direction, the two third electrode portions extend along a second direction, and the first direction is different from the second direction;

wherein the two third electrode portions are separate, and the two third electrode portions are connected by the first electrode portion.

2. The liquid crystal display device of claim 1, wherein a distance between the first side and the third side is in a range from 5 μm to 15 μm.

3. The liquid crystal display device of claim 1, wherein the second electrode portion has a fifth side and a sixth side, the sixth side is disposed away from the gate line, and the second side is disposed between the fifth side and the sixth side.

4. The liquid crystal display device of claim 3, wherein a distance between the second side and the sixth side is in a range from 5 μm to 15 μm.

5. The liquid crystal display device of claim 3, wherein a distance between the first side and the third side is different from a distance between the second side and the sixth side.

6. The liquid crystal display device of claim 3, wherein a ratio of a distance between the second side and the fifth side to a distance between the second side and the sixth side is in a range from 0.95 to 1.05.

7. The liquid crystal display device of claim 1, wherein a width of the first electrode portion and a width of the second portion are in a range from 10 μm to 30 μm.

8. The liquid crystal display device of claim 1, wherein a distance between the first electrode portion and the gate line is different from a distance between the second electrode portion and the gate line.

9. The liquid crystal display device of claim 1, wherein the gate line, the first electrode portion and the second electrode portion are disposed in a same layer.

10. The liquid crystal display device of claim 1, further comprising a color filter layer disposed on the gate line.

11. The liquid crystal display device of claim 1, wherein the electrode layer is a common electrode layer.

12. The liquid crystal display device of claim 1, wherein a width of the first electrode portion is different from a width of the second electrode portion.

13. The liquid crystal display device of claim 1, wherein a ratio of a distance between the first side and the third side to a distance between the first side and the fourth side is in a range from 0.95 to 1.05.

14. The liquid crystal display device of claim 1, further comprising a display medium disposed between the first substrate and the second substrate.

15. The liquid crystal display device of claim 14, wherein the display medium comprises a liquid crystal, an inorganic light-emitting diode, or an organic light-emitting diode.

16. The liquid crystal display device of claim 1, wherein an electroconductive layer is disposed on the first substrate, and the electroconductive layer is a single-layered transparent conductive layer or multiple transparent conductive layers.

17. The liquid crystal display device of claim 1, wherein a first alignment layer is disposed on the first substrate, a second alignment layer is disposed on the second substrate, and a material of the first alignment layer and the second alignment layer comprises polyimide.

18. The liquid crystal display device of claim 1, wherein the light shielding portion is a black matrix.

19. The liquid crystal display device of claim 1, wherein a material of the first electrode portion and the second electrode portion comprises aluminum, copper, molybdenum, titanium, chromium, tungsten, any alloy thereof, or any combination thereof.

* * * * *